US00RE41297E

(19) United States
(12) Reissued Patent
Shimizu

(10) Patent Number: US RE41,297 E
(45) Date of Reissued Patent: May 4, 2010

(54) TONE WAVEFORM GENERATING METHOD AND APPARATUS BASED ON SOFTWARE

(75) Inventor: Masahiro Shimizu, Hamamatsu (JP)

(73) Assignee: Yamaha Corporation, Hamamatsu-Shi (JP)

(21) Appl. No.: 09/456,877

(22) Filed: Dec. 8, 1999

Related U.S. Patent Documents

Reissue of:
(64) Patent No.: 5,696,342
Issued: Dec. 9, 1997
Appl. No.: 08/675,447
Filed: Jul. 3, 1996

(30) Foreign Application Priority Data

Jul. 5, 1995 (JP) ..... 7-169531

(51) Int. Cl.
*G01H 7/00* (2006.01)
*G01H 7/08* (2006.01)

(52) U.S. Cl. ..... 84/603; 84/601; 84/602; 84/604

(58) Field of Classification Search ..... 84/600–608, 84/622–625; 708/172; 709/107; 711/168; 712/221
See application file for complete search history.

(56) References Cited

U.S. PATENT DOCUMENTS 4,128,032 A * 12/1978 Wada et al. ..... 84/604
4,373,416 A * 2/1983 Endo et al. ..... 84/604
5,029,120 A * 7/1991 Brodeur et al. ..... 708/272

(Continued)

FOREIGN PATENT DOCUMENTS

EP 0 376 342 A2 7/1990
EP 0 376 342 * 7/1990
EP 0 463 409 * 1/1992
EP 0 484 047 A2 5/1992
EP 0 597 381 A2 5/1994
EP 0 463 409 A2 1/2002
JP 64-52196 2/1989
JP 4-62595 2/1992
JP 4-136994 5/1992
JP 6-308958 11/1994
WO WO 80/01215 12/1980

OTHER PUBLICATIONS

"Digidesign Turbosynth: Synthesis and Sound Processing for the Apple Macintosh," Computer Music Journal, vol. 12, No. 3, Fall 1988, pp. 79–80.

(Continued)

*Primary Examiner*—Marlon T Fletcher
(74) *Attorney, Agent, or Firm*—Morrison & Foerster LLP

(57) ABSTRACT

A method of generating a tone waveform using a CPU is provided which prevents or minimizes operational delays of other software processing that is executed concurrently with tone waveform generating processing on a multitask basis. The CPU collectively calculates 128 (one block of) tone waveform sample values each corresponding to a sampling clock pulse, and transmits the calculated tone waveform sample values to a reproduction section in response to a predetermined calculation triggering clock pulse generated every 128 samples. When sufficient processing capability of the CPU performing the multitask is available for the waveform sample calculation, tone waveform sample values for one or more following blocks are also calculated and stored in a sample buffer in advance. When the CPU is too busy with the other software processing to execute the waveform sample calculation, it is just sufficient that the previously stored tone waveform sample values be read out to be transmitted to the reproduction section. This prevents operational delays of the other software processing.

75 Claims, 5 Drawing Sheets

U.S. PATENT DOCUMENTS

| | | | | | |
|---|---|---|---|---|---|
| 5,121,667 | A | | 6/1992 | Emery et al. | |
| 5,200,564 | A | | 4/1993 | Usami et al. | |
| 5,276,273 | A | | 1/1994 | Takauji | |
| 5,283,386 | A | * | 2/1994 | Akutsu et al. | 84/603 |
| 5,317,947 | A | | 6/1994 | Miyata | |
| 5,319,151 | A | * | 6/1994 | Shiba et al. | 84/603 |
| 5,345,035 | A | | 9/1994 | Yamada | |
| 5,376,752 | A | * | 12/1994 | Limberis et al. | 84/622 |
| 5,428,183 | A | | 6/1995 | Matsuda | |
| 5,432,293 | A | | 7/1995 | Nonaka | |
| 5,448,009 | A | | 9/1995 | Kudo | |
| 5,553,011 | A | * | 9/1996 | Fujita | 708/272 |
| 5,584,034 | A | | 12/1996 | Usami et al. | |
| 5,596,159 | A | | 1/1997 | O'Connell | |
| 5,668,334 | A | * | 9/1997 | Kuribayashi et al. | 84/602 |
| 5,677,504 | A | * | 10/1997 | Kurata | 84/603 |
| 5,691,493 | A | | 11/1997 | Usami et al. | |
| 5,726,371 | A | | 3/1998 | Shiba | |
| 5,763,801 | A | * | 6/1998 | Gulick | 84/604 |
| 5,895,877 | A | * | 4/1999 | Tamura | 84/625 |

OTHER PUBLICATIONS

Accelerando: A Real–Time, General Purpose Computer Music System, by Kith Lent, et al, Computer Music Journal, vol. 13, No. 4, Winter, 1989, pp. 54–64.

"Digidesign's Sound Accelerator: Lessons Lived and Learned," by Bill Lowe and Robert Currie, Computer Music Journal, vol. 13, No. 1, Spring 1989, pp. 36–46.*

"Musical Applications of Microprocessors," Second Edition, by Hal Chamberlin, 1985, pp. 639–778.*

* cited by examiner

TONE WAVEFORM GENERATING METHOD AND APPARATUS BASED ON SOFTWARE

Matter enclosed in heavy brackets [ ] appears in the original patent but forms no part of this reissue specification; matter printed in italics indicates the additions made by reissue.

BACKGROUND OF THE INVENTION

The present invention relates to a method of and apparatus for generating a tone waveform by a computer executing a software program to calculate tone waveform sample values, to thereby allow a CPU or processor of a micro computer system to function as a tone generator.

Electronic musical instruments are conventionally known which implement a tone generator circuit by a tone generating software program executed by a CPU. In order to reproduce a tone waveform with such known electronic musical instruments, it is necessary to supply tone waveform sample values to a digital-to-analog converter (DAC) regularly in response to clock pulses corresponding to a predetermined sampling frequency. The conventionally-known electronic musical instruments are designed to generate tone waveform samples by performing tone Generating calculation in response to Generation of each clock pulse. But, calculating a tone waveform sample value in response to each such clock pulse would undesirably result in inefficient operation of the CPU because preparing for and ending each tone waveform sample value calculation require a considerable overhead.

To provide a solution to the problem, it has been proposed to calculate a plurality of tone waveform sample values together for each relatively long, optional calculating clock pulse that is generated once every predetermined plurality of sampling clock pulses. However, in cases where the tone generating software program is run concurrently with other software, such as business or game software, burdens on the CPU tend to be significantly great because tone waveform sample values for a plurality of samples have to be calculated in response to each calculating clock pulse, thus resulting in operational delays of the other software.

SUMMARY OF THE INVENTION

It is therefore an object of the present invention to provide a method of and apparatus for generating tone waveform samples by executing tone generating software, which can prevent or minimize operational delays of other software program executed concurrently with the tone generating software.

In order to accomplish the above-mentioned object, the present invention provides a method of generating a tone waveform based on automatic performance information, which includes executing a waveform calculating process for calculating tone waveform samples by sharing an arithmetic processing section with another process, and which is characterized by comprising the steps of detecting a portion of processing capability of the arithmetic processing section that is not currently occupied by the other process as available processing capability for the waveform calculating process, calculating a plurality of tone waveform samples based on the performance information in advance of predetermined generation timing thereof by executing the waveform calculating process using the available processing capability detected by the step of detecting, this step of calculating including a step of storing the calculated tone waveform samples in a memory, and generating a tone waveform by reading out the tone waveform samples from the memory.

The present invention is characterized in that a portion of processing capability of the arithmetic processing section that is not currently occupied by the other process is detected as available processing capability for the waveform calculating process and in that the waveform calculating process is executed using the thus-detected available processing capability so as to calculate tone waveform samples corresponding to the detected available processing capability. The calculated tone waveform samples are stored in a memory and then output from the memory at a predetermined sampling frequency. The calculation of the tone waveform samples is always executed in advance of predetermined generation timing when these samples are to be output. According to the present invention, tone waveform samples are calculated only to the amount corresponding to the detected available processing capability. In cases where a plurality of application programs are concurrently run on a multitask basis, this arrangement of the invention permits extra tone waveform samples to be calculated and saved when sufficient processing capability of the arithmetic processing section is available for the waveform sample calculation, thus providing increased operational efficiency of the arithmetic processing section. Also, even when the arithmetic processing section is busy with another application program, i.e., even when the arithmetic processing section is used for the other application program with priority over the waveform sample calculation, tone waveform samples can continue to be output without a break by just reading out the tone waveform samples calculated and saved previously when sufficient processing capability of the arithmetic processing section was available for the waveform sample calculation, with the result that the other application program can be executed with increased efficiency.

The step of calculating a plurality of tone waveform samples may calculate one or more predetermined units of the tone waveform samples collectively depending on the detected available processing capability, with each of the units being a predetermined number of the tone waveform samples. This arrangement of the invention can substantially reduce the overhead spent in preparing for the waveform sample value calculating process and the like.

Further, in a preferred embodiment, the step of calculating starts calculating the tone waveform samples in advance of the step of generating, and the step of generating starts reading the tone waveform samples from the memory only after a plurality of the tone waveform samples are stored in the memory.

When more than a predetermined number of unread tone waveform samples are not resident in the memory, the step of calculating may calculate a predetermined number of tone waveform samples irrespective of the detected available processing capability. Thus, even when more than a predetermined number of unread tone waveform samples are not resident in the memory (e.g., when no tone waveform sample is contained in the memory at all) due to the fact that the arithmetic processing section is too busy with another process to execute the advanced calculation of tone waveform samples, calculation of tone waveform samples can always be guaranteed to provide a predetermined number of tone waveform samples, which reliably prevents an unwanted break in generated tones.

According to another aspect, the present invention provides a method of generating a tone waveform based on performance information, which includes executing a waveform calculating process for calculating tone waveform samples by sharing an arithmetic processing section with another process, and which is characterized by comprising the steps of detecting an amount of calculation necessary for the other process when the waveform calculating process is to be executed, and calculating tone waveform samples by selectively executing the waveform calculating process that involves s different calculation amount depending on the amount of calculation necessary for the other process detected by the step of detecting.

This arrangement achieves efficient processing by permitting selective switching in the calculation amount of the waveform calculating process. For example, the calculation amount is made relatively small when the amount of calculation necessary for the other process is relatively great; otherwise the calculation amount is made relatively great.

Preferably, tone waveform samples may be calculated with different precision depending on the calculation amount involved in the waveform calculating process. Namely, by selectively switching the calculating precision of the waveform calculating process depending on the amount of calculation necessary for the other process, tone waveform samples can be calculated with relatively low (coarse) precision when the amount of calculation necessary for the other process is relatively great, while tone waveform samples can be calculated with relatively high (fine) precision when the amount of calculation necessary for the other process is relatively small. This allows tone waveform samples to be generated without involving increased burdens on the arithmetic processing section and influencing the other process and without causing an unwanted break.

According to still another aspect, the present invention provides a method of generating tone waveforms corresponding to first performance information based on a real-time performance and second performance information based on an automatic performance, which includes executing a waveform calculating process for calculating tone waveform samples on the basis of the first and second performance information, respectively, by use of a common arithmetic processing section, and which is characterized by comprising the steps of calculating a predetermined number of first tone waveform samples for each predetermined period on the basis of the first performance information supplied in response to a real-time performance, detecting a portion of processing capability of the arithmetic processing section which is not currently occupied by a process for calculating the first tone waveform samples as available processing capability for generation of a tone waveform based on the second performance information, calculating second tone waveform samples based on the second performance information in advance of predetermined generation timing thereof using the available processing capability detected by the step of detecting, storing in a memory the first and second tone waveform samples calculated by the steps of calculating, and generating tone waveforms corresponding to the real-time performance and automatic performance by synchronously reading the first and second tone waveform samples from the memory.

According to this arrangement, the second tone waveform samples based on the second performance information are calculated and saved in advance of predetermined generation timing thereof, when sufficient processing capability of the arithmetic processing section is available. Thus, when the first performance information is supplied in response to a real-time performance, the process for calculating the first tone waveform samples on the basis of the first performance information can be executed with priority over the process for calculating the second tone waveform samples. The burdens on the arithmetic processing section are effectively distributed timewise, which achieves increased operational efficiency of the processing section.

BRIEF DESCRIPTION OF THE DRAWINGS

For better understanding of various features of the present invention, the preferred embodiments of the invention will be described in detail hereinbelow with reference to the accompanying drawings, in which.

DETAILED DESCRIPTION OF THE PREFERRED EMBODIMENTS

Figure 1:
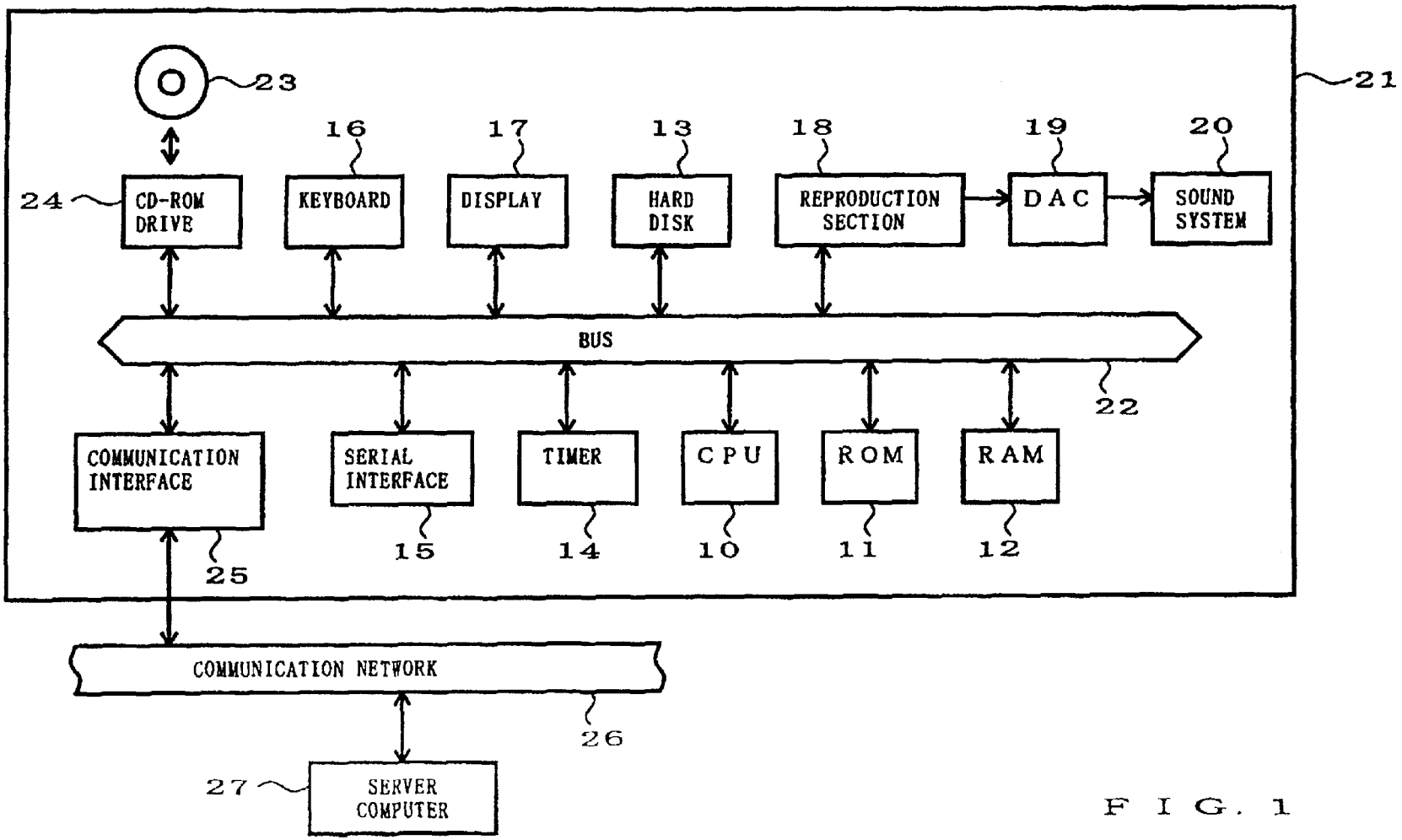
FIG. 1 is a block diagram illustrating an exemplary hardware structure of a microcomputer system which has a tone generating function based on the principle of the present invention.

FIG. 1 is a block diagram illustrating an exemplary hardware structure of a microcomputer system 21 which has a tone generating function based on the principle of the present invention. The microcomputer system 21 comprises a CPU 10 as an arithmetic processing section, to which are connected, via a bus 22, a ROM 11, a RAM 12, a hard disk device 13, a timer 14, a serial interface 15, a keyboard 16, a display 17 and a reproduction section 18. The ROM 11 has prestored therein a basic operating program that is essential to the operation of the microcomputer system 21. The RAM 12 buffers data and a program to be executed, as well as various data occurring during execution of a program by the CPU 10. The hard disk device 13 has prestored therein a multimedia application software set as shown in FIG. 2, etc. and the multimedia application software set is read into the RAM 12 prior to its execution. At predetermined regular intervals, the timer 14 outputs an interrupt signal to the CPU 10 and sends sampling clock pulses to the reproduction section 18. The serial interface 15 is provided for transmitting and receiving data and control signals to and from various external peripherals connected to the microcomputer system 21.

The keyboard 16 and display 17 may both be of any suitable type depending on a particular application of the microcomputer system 21. Where the system 21 is applied for example as an electronic musical instrument, the keyboard 16 may be the one conventional with an electronic piano keyboard or the like, and the display 17 may be a conventional LCD (Liquid Crystal Display). Where the system 21 is applied as a karaoke device, the keyboard 16 may be one specialized to permit a selection from among pre-recorded music pieces and desired tempo control, and the display 17 may be a large-size CRT monitor.

The reproduction section 18 is a so-call sound board, which stores in its internal buffer waveform data for a plurality of samples received from the CPU 10 and outputs the waveform data to the D/A converter 19 in response to each sampling clock generated by the timer 14. The internal buffer of the reproduction section 18 is of a type where data can be additionally written, so that each group (i.e., block) of waveform data received from the CPU 10 is stored in the buffer immediately after another waveform data group being currently read out from the buffer. The buffer may be constructed as a FIFO, dual-port or other suitable memory structure. The D/A converter 19 converts each waveform data supplied from the reproduction section 18 into an analog tone signal, which is then audibly reproduced through a sound system 20 comprised of amplifiers and speakers.

In the above-mentioned hard disk 13, there may be stored various other data such as automatic performance data and chord progression data and the above-mentioned operating program. By prestoring the operating program in the hard disk 13 rather than in the ROM 11 and loading the operating program into the RAM 12, the CPU 10 can operate in exactly the same way as where the operating program is stored in the ROM 11. This greatly facilitates version-up of the operation program, addition of an operating program, etc. A CD-ROM (compact disk) 23 may be used as a removably-attachable external recording medium for recording various data such as automatic performance data, chord progression data and tone waveform data and an optional operating program similarly to the above-mentioned. Such an operating program and data stored in the CD-ROM 23 can be read out by a CD-ROM drive 24 to be transferred for storage into the hard disk 13. This facilitates installation and version-up of the operating program. The removably-attachable external recording medium may of course be other than the CD-ROM, such as a floppy disk and magneto optical disk (MO).

A communication interface 25 may be connected to the bus 22 so that the microcomputer system 21 can be connected via the interface 25 to a communication network 26 such as a LAN (Local Area Network), internet and telephone line network and can also be connected to an appropriate sever computer 27 via the communication network 26. Thus, where the operating program and various data are not contained in the hard disk 13, these operating program and data can be received from the server computer 27 and downloaded into the hard disk 13. In such a case, the microcomputer system 21, a "client", sends a command requesting the server computer 27 to download the operating program and various data by way of the communication interface 25 and communication network 26. In response to the command, the server computer 27 delivers the requested operating program and data to the microcomputer system 21 via the communication network 26. The microcomputer system 21 completes the necessary downloading by receiving the operating program and data via the communication network 25 and storing these into the hard disk 13.

It should be understood here that the microcomputer system 21 may be implemented by installing the operating program and various data corresponding to the present invention in any commercially available personal computer. In such a case, the operating program and various data corresponding to the present invention may be provided to users in a recorded form on a recording medium, such as a CD-ROM or floppy disk, which is readable by the personal computer. Where the personal computer is connected to a communication network such as a LAN, the operating program and various data may be supplied to the personal computer via the communication network similarly to the above-mentioned.

Figures 2A, 2B, 2C, 2D:
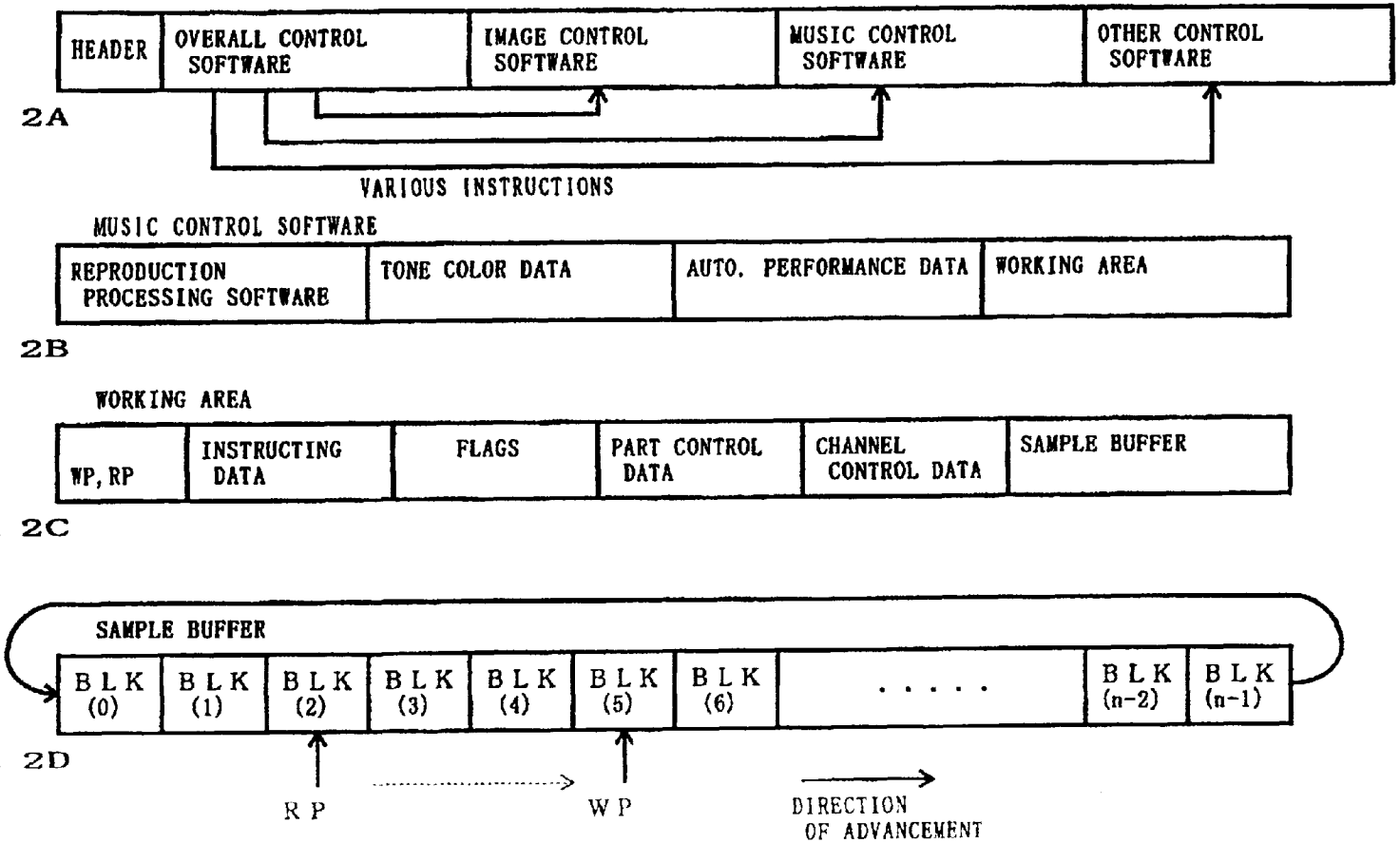
FIGS. 2A to 2D are diagrams illustrating exemplary configurations of various software programs stored in the microcomputer system of FIG. 1.

FIG. 2 shows an exemplary configuration of the multimedia-type application software set stored in the RAM 12 of FIG. 1. As shown in FIG. 2A, this multimedia-type application software set, which may for example be for karaoke performance or for game playing, comprises a header, overall control software, image control software, music control software and other control software. The header contains various data indicative of a version, memory size, etc. of the multimedia-type application software set. The overall control software controls the concurrent or parallel operation of the above-mentioned software in such a manner that all these software operates smoothly, and the image control software controls various images to be presented on the display 17. The music control software controls automatic performance based on automatic musical performance data and generation of a tone waveform based on performance data supplied on a real-time basis. The other control software controls input by a user and other operations.

FIG. 2B shows a detail of the music control software, which includes reproduction processing software, a tone color data section, an automatic performance data section and a working area. The reproduction processing software performs various operations, as flowcharted in FIGS. 4, 5 and 6, to simulate the function of a hardware tone generator. The tone color data section contains various data to actually drive the reproduction processing software, including parameters for calculating waveform sample values and controlling envelopes, filter controlling parameters, etc. Where the reproduction processing software is designed to simulate a PCM (Pulse Code Modulation) tone generator, the tone color data section contains waveform data themselves. The automatic performance data section contains sequence data for automatically performing background and karaoke music. The working area provides various registers to store data that become necessary as the reproduction processing software runs as well as data produced during various processes, and the working area corresponds to internal registers of a conventional hardware tone generator and registers of various peripherals (e.g., of an interface) connected thereto.

Figure 3:
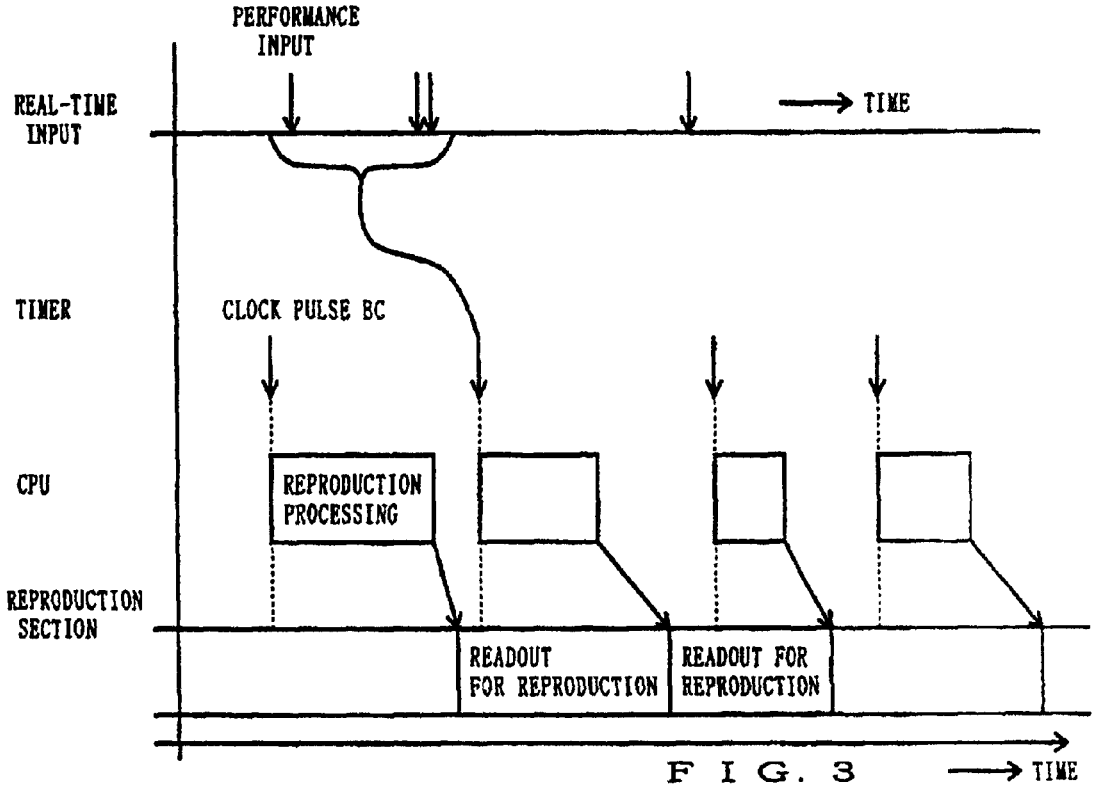
FIG. 3 is a timing chart explanatory of reproduction processing carried out in the microcomputer system.

FIG. 2C shows a detail of the working area, FIG. 2D shows a detail of a sample buffer contained in the working area, and FIG. 3 is a timing chart explanatory of tone waveform generating operations of the microcomputer system 21. As shown, the sample buffer is a ring buffer comprising "n" blocks BLK(0) to BLK(n−1), and according to the present invention, waveform data for 128 samples (128 waveform sample values) are written in each of the blocks.

In FIG. 3, the reproduction processing software is activated by a calculation triggering clock pulse BC generated every 128 sampling clock pulses. The reproduction processing software sends stored waveform data of each of the blocks of the sample buffer to the reproduction section 18, and also, while checking for the operational availability of the CPU 10, writes waveform data into the block so far as the data writing does not adversely influence other operations. Real-time performance data entered by the user or player via the keyboard 16 are input in response to a first calculation triggering clock pulse BC generated after the entry, so that corresponding waveform sample values are calculated. The reproduction section 18 buffers the waveform data that are input via the CPU 10 in response to the calculation triggering clock pulse BC, and the buffered waveform data are then read out, one sample for each sampling clock, and supplied to the D/A converter 19.

As shown in FIG. 2D, each of the blocks in the sample buffer in which waveform data are to be written is pointed to by a writing block pointer WP, while each of the blocks in the sample buffer from which waveform data are to be read out is pointed to by a reading block pointer RP. In FIG. 2C, reference character WF represents a write-enable flag and reference character RF represents a read-enable flag. The read-enable flag RF is kept set throughout a period from the start to end of an automatic performance, and the write-enable flag WF is kept set throughout a period from writing of first data to writing of last data of an automatic performance. Because the data writing takes place in advance of the data reading in accordance with the present invention, the data writing and reading periods, i.e., the periods during which the write-enable flag WF and the read-enable flag RF are set, do not conform to each other.

In instructing data and instructing flag sections of the working area are written various instructions given from the overall control software, and these sections correspond to an instruction register within a conventional hardware tone generator. Specifically, data written in the instructing data and instructing flag sections are for example:

- data designating a specific music piece number for which automatic performance data are to be reproduced, because the music control software contains automatic performance data for a plurality of music pieces;
- data designating a range to be reproduced in a case where only part of performance data of a specific music piece are to be reproduced;
- data designating a tone color for each performance part; and
- real-time performance data input via the keyboard 16 and serial I/O 15 which may be suitably received the above-mentioned other control software.

Part control data section of the working area contains tone color selecting data, tone volume level controlling data, etc. for each performance part in a case where multipart automatic performance data are to be reproduced.

Channel control data section contains control data on a per-channel basis since the reproduction processing software is designed to deal with simultaneous sounding of tones in a plurality of tone generating channels. Specifically, the channel control data include various data necessary for each of the channels to generate a tone signal, such as data designating a musical scale, a current address counter value, data determining a shape and current value of an envelope. Namely, this channel control data section corresponds to registers within a conventional hardware tone generator.

Figure 4:
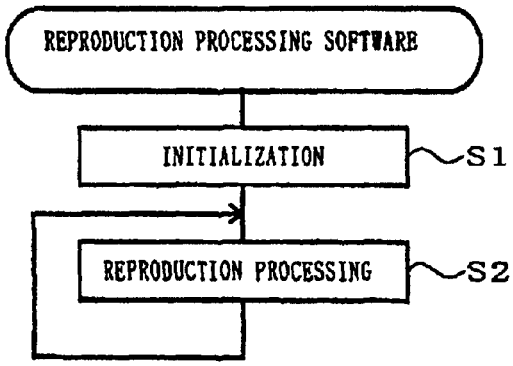
FIG. 4 is a flowchart illustrating exemplary operation of the microcomputer system.

Exemplary operation of the microcomputer system 21 will be described in greater detail hereinbelow with reference to flowcharts of FIGS. 4, 5 and 6. FIG. 4 is a flowchart illustrating an example of a main routine of the reproduction processing software used in the microcomputer system 21, in which reproduction processing is executed in a repetitive manner at step S2 after initialization of step S1.

Figure 5:
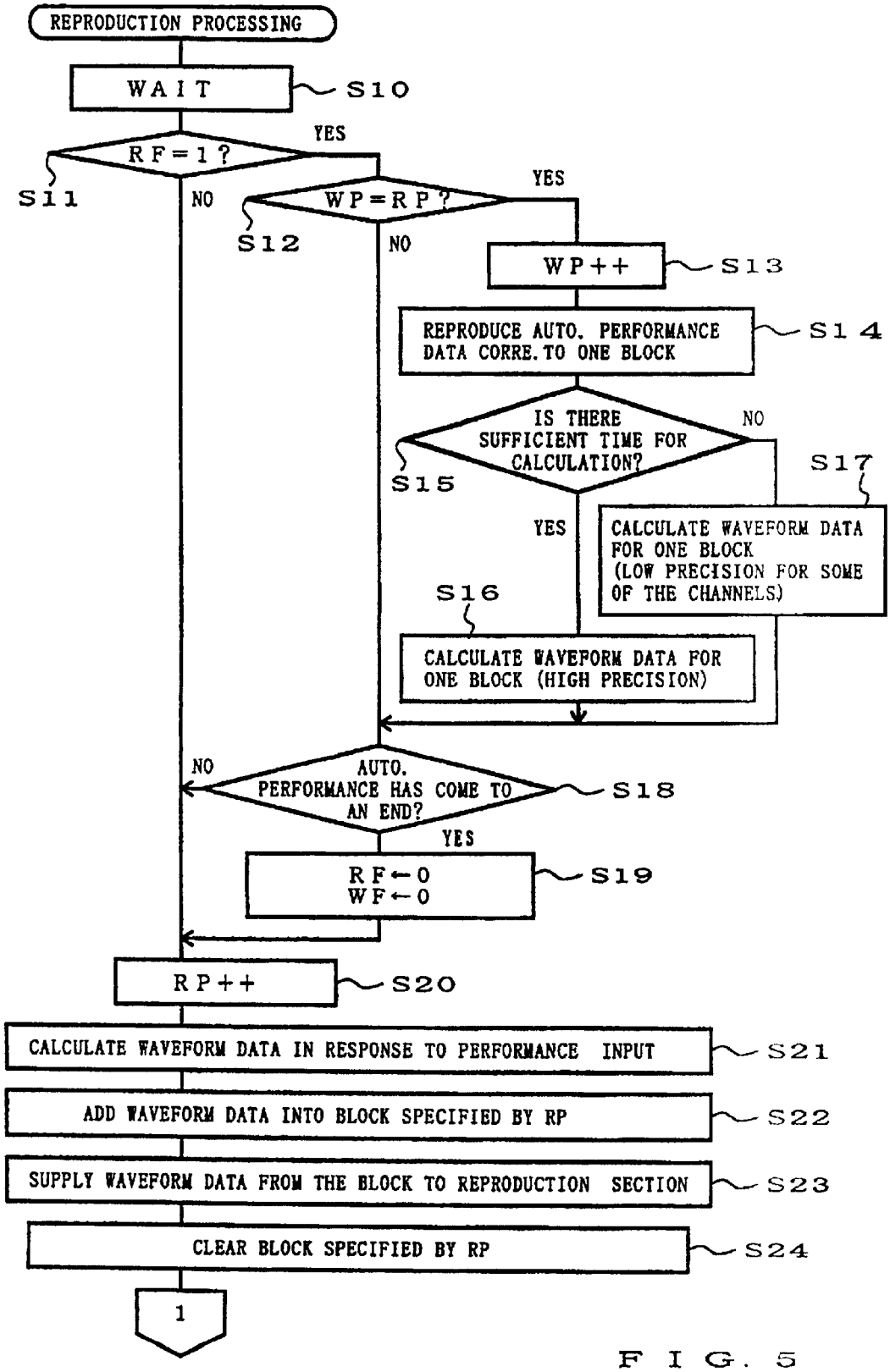
FIG. 5 is a flowchart illustrating a part of a detailed control flow of the reproduction processing.
Figure 6:
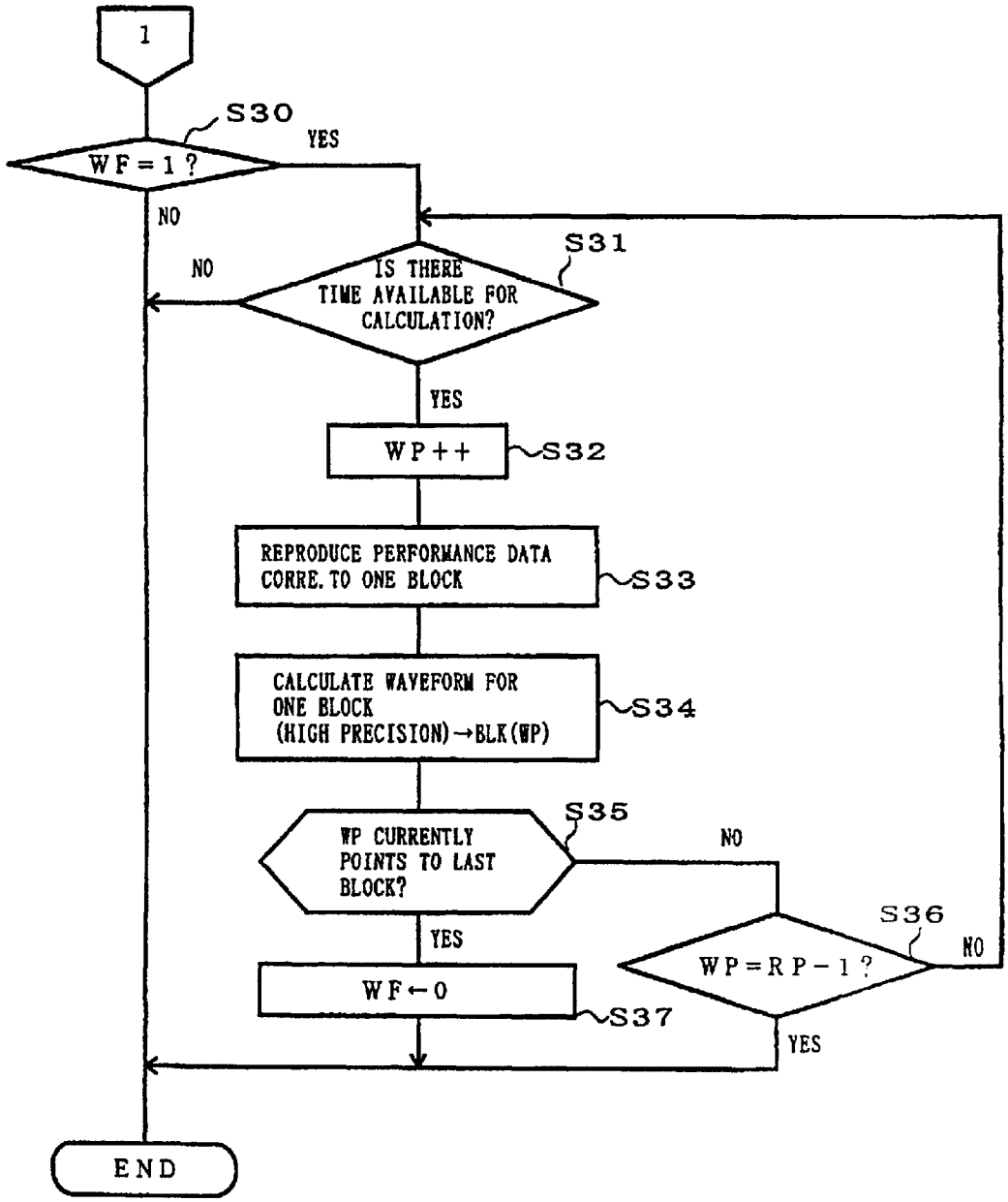
FIG. 6 is a flowchart illustrating the remaining part of the control flow of the reproduction processing.

FIGS. 5 and 6 illustrate a detailed control flow of the reproduction processing. First, at step S10, the reproduction processing waits for a calculation triggering clock pulse BC to be generated. Assume that during this wait period, another process is being executed with the control returned to the overall control software. Upon generation of the calculation triggering clock pulse BC, the reproduction processing proceeds from step S10 to step S11, where a determination is made as to whether the read-enable flag RF is currently set to a value of "1" or not. If answered in the affirmative at step S11, this means that an automatic performance is currently in progress, so that the reproduction processing goes to step S12 to calculate waveform data for the automatic performance. At step S12, a comparison is made between current values of the writing block pointer WP and the reading block pointer RP. If the current value of the writing block pointer WP equals that of the reading block pointer RP (WP=RP), this means that waveform data of a block to be read out (to be sent to the reproduction section 18) this time have not yet been calculated, and thus arithmetic operations are performed at steps S13 to S17 to calculate waveform data of that block.

At step S13, the writing block pointer WP is incremented or advanced by one; however, because the sample buffer is a ring buffer as mentioned earlier, it is reset to "0" upon reaching its maximum value (this is true with incrementing operations of the writing and reading block pointers WP and RP as will be described later). Automatic performance data corresponding to one block are reproduced at next step S14. Then, at step S15, it is determined whether there is sufficient time for calculating waveform data corresponding to the automatic performance data. If answered in the affirmative at step S15, calculation of waveform sample data is effected at step S16 with relatively high precision (for example, 48 kHz in calculating frequency and 32 bits in data size), If, however, there is no sufficient time for such high-precision waveform data calculation as determined at step S15, the calculation is effected at step S17 with the calculating precision lowered by a degree corresponding to the shortage of the calculating time. The lowering of the calculating precision may be effected by lengthening the sampling clock period and/or reducing the number of bits to be calculated at a time. After step S6 or S17, the reproduction processing proceeds to step S18.

If the value of the writing block pointer WP is greater than that of the reading block pointer RP as determined at step S12, this means that waveform data of the block to be read out this time have already calculated, and thus the reproduction processing goes from step S12 to step S18 directly.

At step S18, a determination is made as to whether the automatic performance has come to an end, by ascertaining whether the block to be read out this time is a last block (i.e., a block containing an end point). If the block to be read out this time is the last block, generation and readout of waveform data based on the automatic performance data are no longer necessary, so that the write-enable flag WF and read-enable flag RF are both reset to "0" at step S19. After the resetting of the write-enable and read-enable flags WF and RF, the reproduction processing proceeds to step S20 for calculation of a waveform corresponding to a real-time performance and transmission of the waveform data to the reproduction section 18.

When an automatic performance is not under way and hence the read-enable flag RF is at a value of "0", the reproduction processing goes directly from step S11 to step S20 in order to increment the reading block pointer RP. Waveform data of the block specified by the reading block pointer RP (BLK(RP)) are transmitted to the reproduction section 18 at step S23 as will be later described. A tone waveform is calculated in response to the player's real-time performance data input at step S21, and the calculated waveform data are added into the block specified by the reading block pointer RP at step S22. The waveform data are then supplied from the block to the reproduction section 18 at step S23. After this, the block is cleared at step S24 now that the data of the block BLK(RP) are no longer necessary due to the data supply to the reproduction section 18. Namely, "0" is written into every location of that block.

After step S24, the reproduction processing performs operations at and after step S30 to effect data writing in advance of data reading. At step S30, a determination is made as to whether the write-enable flag WF is currently set to "1" (WF=1). If answered in the affirmative at step S30, this means that there is any other automatic performance data to be written, so that data writing operations are performed at and after steps S31. If, on the other hand, the write-enable flag WF is not currently set to "1" (WF=0), this means that predetermined automatic performance have been calculated to the end, so that the reproduction processing is brought to an end without performing any other operations.

At step S31, a determination is made as to whether there is time available for the "advanced" data writing, i.e., whether the CPU 10 is not busy with any other software concurrently run with the reproduction processing software. If there is time available for the data writing, the writing block pointer WP is incremented by one at step S32 so as to point to a block in which data are to be written after this, and performance data corresponding to one block are read out for reproduction at step S33. Then, waveform data for one block are calculated on the basis of the read-out performance data at step S34, and the calculated waveform data are written into a block pointed to by the writing block pointer WP. In this case, the waveform data calculation is executed with high precision for all the tone generating channels because sufficient time can be spent on the calculation.

Thereafter, the reproduction processing goes to step S35 to make a determination as to whether the block for which the data writing has been executed this time is the last block, or to step S36 to make a determination as to whether the sample buffer is now full of unread waveform data. If the block is the last block as determined at step S35, the write-enable flag WF is reset to "0" at step S37 because it is no longer necessary to write waveform data, and then the reproduction processing is brought to an end. The determination as to whether the sample buffer is now full of unread waveform data is made by checking whether the writing block pointer WP has catch up with the reading block pointer RP after making a round through the ring buffer in advance of the reading block pointer RP (WP=RP−1). Writing new data when the sample buffer is full of unread data will result in overwriting unread data, and thus the reproduction processing is brought to an end after the affirmative determination at step S36. If the sample buffer is not full of unread data, i.e., has any other block available for writing data, as determined at step S36, the reproduction processing loops from step S36 back to step S31. If it is determined at step S31 that there is still time left, then the data writing is performed for a next block.

In the above-described reproduction processing, the reading block pointer RP is constructed as a so-called "free-running" counter because the sample buffer may be used for real-time performance data input when an automatic performance is not executed and the pointer RP is incremented whenever the reproduction processing steps through steps S20 to S24. Therefore, when waveform data are to be written into the sample buffer prior to a start of an automatic performance (i.e., before the read-enable flag RF is set to "1"), it is determined how earlier than the start of an automatic performance the writing of waveform data should be initiated (namely, a determination is made of a specific number of counts of the calculation triggering clock pulses BC by which the writing of waveform data should precede the automatic performance start), and then the writing block pointer WP is set to a value equivalent to a sum of a current value of the writing block pointer WP and the number of counts by which the data writing should precede the data reading. After this, the write-enable flag is set to "1" so that leading waveform data start being written into the block pointed to by the writing block pointer WP.

Once the specific number of the calculation triggering clock pulses B are generated and hence the reading block pointer RP reaches the block where the waveform data writing was initiated, the automatic performance is started (i.e., the read-enable flag RF is set to "1") and the waveform data are read out properly from the beginning. By virtue of the arrangement that the data writing is executed (i.e., the write-enable flag WF is set to "1") prior to the start of the automatic performance (i.e., the read-enable flag RF is set to "1"), the function of executing the data writing (calculation) in advance of the data reading can be utilized effectively from the starting point of the automatic performance.

In summary, according to the above-described embodiment, there are provided a plurality of storage regions (blocks) for storing waveform data (waveform sample values), waveform data to be supplied to the D/A converter 19 are generated collectively in advance during a period when the amount of calculation necessary for another software processing executed in parallel with the reproduction processing software is small (i.e., when the CPU 10 is not busy with the other software processing), and the thus-generated waveform data are stored in the blocks of the sample buffer. Thus, when the calculation amount of the other software processing increases temporarily, waveform data generating operations to be performed at that time can be skipped without any trouble since waveform data to be supplied to the reproduction section 18 at that timing have been generated and saved previously. This prevents operational delays in the other software processing. Because generation and supply to the reproduction section 18 of waveform data are conducted on a block-by-block basis, a determination as to whether there is time available is greatly facilitated and a plurality of waveform data can be generated collectively, which provide increased operating efficiency.

Each of the blocks of the sample buffer has been described as storing 128 waveform samples, but, where the system is designed to no accept real-time performance data input, each of the blocks may be designed to store a greater number of samples, e.g., 1,024 or 4,096 samples, so as to permit the CPU 10 to operate more efficiently. However, where the system accepts real-time performance data input, designing each of the blocks to store such a greater number of samples is not preferable in that intervals between the calculation triggering clock pulses BC become longer and hence greater time lags will occur from the real-time performance data input to actual sounding of a tone corresponding thereto.

The present invention arranged in the above-described manner achieves the following benefits.

According to the present invention, a detection is made of calculating capability of the CPU 10 or arithmetic processing section that is unoccupied by other software processing and hence available for the reproduction processing and a specific number of tone waveform sample values corresponding to the unoccupied or available calculating capability are generated prior to predetermined readout timing of the sample values. Thus, when a plurality of applications are run concurrently on a multitask basis, it is allowed to calculate waveform data collectively for memory storage utilizing the unoccupied or available calculating capability, which permits the CPU or arithmetic processing section to operate with greatly increased efficiency. Because it is just sufficient that the previously stored waveform data be read out to be transmitted to the reproduction section 18 when the arithmetic processing section is busy with another application, processing by the other application can be performed efficiently without being influenced by the waveform sample calculation.

Further, because a predetermined number of tone waveform sample values are set as a basic calculating unit and tone waveform sample values are actually calculated on a unit-by-unit basis, it is possible to reduce the overhead spent in preparing for the waveform value calculating processing etc. Furthermore, because a predetermined number of tone waveform sample values are already prepared and stored in memory at a starting point of an automatic performance, additional adjusting functions by the advanced calculation can be performed efficiently from the starting point of an automatic performance.

Moreover, even when the advanced calculation of tone waveform sample values can not be conducted due to great loads placed on the arithmetic processing section by other processing, the present invention can prevent an unwanted break in generated sounds because the waveform calculating steps are always taken to prepare tone waveform sample values.

In addition, the present invention is characterized in that when calculating tone waveform sample values, a detection is made of an amount of calculation necessary for the arithmetic processing section to conduct other processing and the waveform sample value calculation is executed with different calculating precision which is selectable in accordance with the detected calculation amount for the other processing. Even when the arithmetic processing section is busy with the other processing, loads on the arithmetic processing section can be effectively lessened by selecting low calculating precision to reduce the amount of tone waveform sample calculation. As a result, generation of tone waveform data can be continued with no break and without influencing the other processing.

Moreover, according to the present invention, tone generating processing based on an automatic performance is executed in advance during a period when tone generating processing based on a real-time performance is not placing heavy burdens on the arithmetic processing section. As a result, the burdens on the arithmetic processing section can be distributed timewise, which achieves greatly increased operational efficiency of the arithmetic processing section.

What is claimed is:

1. A method of generating a tone waveform based on automatic performance information, using a processor device executing a plurality of different programs on a time division basis, said method including executing a waveform calculating process for calculating tone waveform samples on the basis of one of the programs by sharing the processor device with another process based on another one of the programs, said method comprising the steps of:

detecting an available time portion in which said processor device is not currently used for the other process, as available processing capability for the waveform calculating process;

calculating a plurality of tone waveform samples based on the performance information in advance of predetermined generation timing thereof by executing the waveform calculating process using said available processing capability detected by said step of detecting, said step of calculating including a step of storing the calculated tone waveform samples in a memory; and generating a tone waveform by reading out the tone waveform samples from the memory.

2. A method as defined in claim 1 wherein said step of calculating calculates one or more predetermined units of the tone waveform samples depending on said detected available processing capability, each said unit being a predetermined number of the tone waveform samples.

3. A method as defined in claim 1 wherein said step of calculating starts calculating the tone waveform samples in advance of said step of generating, and said step of generating starts reading the tone waveform samples from the memory after a plurality of the tone waveform samples are stored in the memory.

4. A method as defined in claim 1 wherein when more than a predetermined number of unread tone waveform samples are not resident in the memory, said step of calculating calculates a predetermined number of tone waveform samples irrespective of said detected available processing capability.

5. A method of generating a tone waveform based on [automatic] performance information, using a processor device executing a plurality of different programs on a time division basis, said method including executing a waveform calculating process for calculating tone waveform samples on the basis of one of the programs by sharing the processor device with another process based on another one of the programs, *the waveform calculating process being executed per predetermined constant period so as to collectively generate a plurality of tone waveform samples per execution of the waveform calculating process,* said method comprising the steps of:

detecting an amount of calculation time necessary for the other process, when the waveform calculating process is to be executed; [and]

calculating tone waveform samples by selectively executing the waveform calculating process that involves a variable calculation amount which depends on said amount of calculation time necessary for the other process detected by said step of detecting*; and*

*outputting the tone waveform generated by the waveform calculating process.*

6. A method as defined in claim 5 wherein said step of calculating calculates the tone waveform samples with different precision depending on the calculation amount involved in the waveform calculating process.

7. A method of generating tone waveforms corresponding to first performance information based on a real-time performance and second performance information based on an automatic performance, which includes executing a waveform calculating process for calculating tone waveform samples on the basis of said first and second performance information, respectively, by use of a common arithmetic processing section, said method comprising the steps of:

calculating a predetermined number of first tone waveform samples for each predetermined period on the basis of said first performance information supplied in response to a real-time performance;

detecting a portion of processing capability of said arithmetic processing section which is not currently occupied by a process for calculating said first tone waveform samples, as available processing capability for generation of a tone waveform based on said second performance information;

calculating second tone waveform samples based on said second performance information in advance of predetermined generation timing thereof, using said available processing capability detected by said step of detecting;

storing in a memory said first and second tone waveform samples calculated by said steps of calculating; and generating tone waveforms corresponding to the real-time performance and automatic performance by synchronously reading said first and second tone waveform samples from the memory.

8. A method as defined in claim 7 wherein said step of storing in a memory includes a step of adding said first and second tone waveform samples for each sample corresponding to same generation timing so as to store resultant added tone waveform samples in the memory, and said step of generating reads out the added tone waveform samples from the memory.

9. A method of generating tone waveforms corresponding to first performance information based on a real-time performance and second performance information based on an automatic performance, which includes executing a waveform calculating process for calculating tone waveform samples on the basis of said first and second performance information, respectively, by use of a common arithmetic processing section, said method comprising the steps of:

calculating a predetermined number of first tone waveform samples for each predetermined block period on the basis of said first performance information supplied in response to a real-time performance, said step of calculating including a step of, at [optional] *a* time within first said block period, calculating said predetermined number of first tone waveform samples to be generated within second said block period following said first block period and storing the calculated first tone waveform samples in a memory, said first tone waveform samples stored in the memory being sequentially read out at regular sampling intervals in said second block period;

detecting a portion of processing capability of said arithmetic processing section which is not currently occupied by a process for calculating said first tone waveform samples, as available processing capability for generation of a tone waveform based on said second performance information;

calculating second tone waveform samples based on said second performance information in advance of predetermined generation timing thereof, using said available processing capability detected by said step of detecting, said step of calculating second tone waveform samples including a step of storing in a memory the calculated second tone waveform samples; and generating tone waveform samples corresponding to the real-time performance and automatic performance by, at regular sampling intervals, reading out from the memory said first and second tone waveform samples corresponding to each same said block period.

10. A method as defined in claim 9 wherein said step of storing said first and second tone waveform samples adds said first and second tone waveform samples, for each sample, that are to be generated in same said block period so as to store resultant added tone waveform samples in the memory, and said step of generating reads out the added tone waveform samples from the memory.

11. A machine-readable recording medium containing a group of instructions to cause said machine to generate a tone waveform based on automatic performance information by executing a waveform calculating process for calculating tone waveform samples by using a processor device, the processor device also executing another process in response to a different group of instructions, said [medium] *group of instructions executable by said processor device to perform a method* comprising *the steps of*:

[means for] instructing the machine to detect a time portion in which said processor device is not currently used for the other process, as available processing capability for the waveform calculating process;

[means for] instructing the machine to calculate a plurality of tone waveform samples based on the automatic performance information in advance of predetermined generation timing thereof by executing the waveform calculating process using said detected available processing capability, said means for instructing the machine to calculate including means for instructing the machine to store the calculated tone waveform samples in a memory; and

[means for] instructing the machine to generate a tone waveform by reading out the tone waveform samples from the memory.

12. A machine-readable recording medium containing a group of instructions to cause said machine to generate a tone waveform based on performance information by executing a waveform calculating process for calculating tone waveform samples by using a processor device, the processor device also executing another process in response to a different group of instructions, [said medium comprising] *the waveform calculating process being executed per predetermined constant period so as to collectively generate a plurality of tone waveform samples per execution of the waveform calculating process, said group of instructions executable by said processor device to perform a method comprising the steps of*:

[means for] instructing the machine to detect an amount of calculation time necessary for the other process, when the waveform calculating process is to be executed;

[means for] instructing the machine to calculate tone waveform samples by selectively executing the waveform calculating process that involves a variable calculation amount that depends on said detected amount of calculation time necessary for the other process; and

[means for] instructing the machine to generate a tone waveform based on the calculated tone waveform samples.

13. A machine-readable recording medium containing a group of instructions to cause said machine to generate tone waveforms corresponding to first performance information based on a real-time performance and second performance information based on an automatic performance, by executing a waveform calculating process for calculating tone waveform samples on the basis of said first and second performance information, respectively, by use of a common arithmetic processing section, said [medium] *group of instructions* comprising *the steps of*:

[means for] instructing the machine to calculate a predetermined number of first tone waveform samples for each predetermined period on the basis of said first performance information supplied in response to a real-time performance;

[means for] instructing the machine to detect a portion of the processing capability of said arithmetic processing section which is not currently occupied by a process for calculating said first tone waveform samples, as available processing capability for generation of a tone waveform based on said second performance information;

[means for] instructing the machine to calculate second tone waveform samples based on said second performance information in advance of predetermined generation timing thereof, using said detected available processing capability;

[means for] instructing the machine to store in a memory said first and second tone waveform samples calculated by said steps of calculating; and

[means for] instructing the machine to generate tone waveforms corresponding to the real-time performance and automatic performance by synchronously reading said first and second tone waveform samples from the memory.

14. A machine-readable recording medium containing a group of instructions to cause said machine to generate tone waveforms corresponding to first performance information based on a real-time performance and second performance information based on an automatic performance, by executing a waveform calculating process for calculating tone waveform samples on the basis of said first and second performance information, respectively, by use of a common arithmetic processing section, said [medium] *group of instructions* comprising *the steps of*:

[means for] instructing the machine to calculate a predetermined number of first tone waveform samples for each predetermined block period on the basis of said first performance information supplied in response to a real-time performance, including means for instructing the machine to calculate, at an optional time within a first said block period, said predetermined number of first tone waveform samples to be generated within a second said block period following said first block period, and means for instructing the machine to store the calculated first tone waveform samples in a memory, and sequentially read out at regular sampling intervals in said second block period said first tone waveform samples stored in the memory;

[means for] instructing the machine to detect a portion of the processing capability of said arithmetic processing section which is not currently occupied by the process of calculating said first tone waveform samples, as available processing capability for generation of a tone waveform based on said second performance information;

[means for] instructing the machine to calculate second tone waveform samples based on said second performance information in advance of predetermined generation timing thereof, using said detected available processing capability, said means for instructing the machine to calculate second tone waveform samples including means for instructing the machine to store in a memory the calculated second tone waveform samples; and means for instructing the machine to generate tone waveform samples corresponding to the real-time performance and automatic performance by, at regular sampling intervals, reading out from the memory said first and second tone waveform samples corresponding to each same said block period.

15. A computer system for generating a tone waveform based on automatic performance information, said computer system comprising:

a memory device that stores a plurality of programs; and a processor device that executes a waveform generating process including a waveform calculating process for calculating tone waveform samples based on a predetermined one of said programs, and one or more other processes based on other of said programs in a parallel manner on a time-divisional basis, wherein said [processor device] *predetermined one of said programs* includes *the steps of*:

[means for] detecting an available time portion in which said processor device is not currently occupied by the other process, as available processing capability for the waveform calculating process;

[means for] calculating a plurality of tone waveform samples based on the performance information in advance of predetermined generation timing thereof by executing the waveform calculating process using said available processing capability detected by said [means for] *step of* detecting;

[means for] storing the calculated tone waveform samples in a memory; and

[means for] generating a tone waveform by reading out the tone waveform samples from the memory.

16. A computer system for generating a tone waveform based on performance information, said computer system comprising:

a memory device that stores a plurality of programs; and a processor device that executes a waveform generating process including a waveform calculating process for calculating tone waveform samples based on a predetermined one of said programs and one or more other processes based on other of said programs in a parallel manner on a time-division basis, *the waveform calculating process being executed per predetermined constant period so as to collectively generate a plurality of tone waveform samples per execution of the waveform calculating process,* wherein said [processor device] *predetermined one of said programs* includes *the steps of*:

[means for] detecting an amount of calculation time necessary for said other process, when the waveform calculating process is to be executed; and

[means for] calculating tone waveform samples by selectively executing the waveform calculating process that involves a variable calculation amount which depends on said amount of calculation necessary for said other process detected by said means for detecting.

17. A computer system for generating tone waveforms corresponding to first performance information based on a real-time performance and second performance information based on an automatic performance, which executes a waveform calculating process for calculating tone waveform samples on the basis of said first and second performance information, respectively, by use of a common arithmetic processing section, said [computer system] *waveform calculating process* comprising *the steps of*:

[means for] calculating a predetermined number of first tone waveform samples for each predetermined period on the basis of said first performance information supplied in response to a real-time performance;

[means for] detecting a portion of processing capability of said arithmetic processing section which is not currently occupied by a process for calculating said first tone waveform samples, as available processing capability for generation of a tone waveform based on said second performance information;

[means for] calculating second tone waveform samples based on said second performance information in advance of predetermined generation timing thereof, using said available processing capability detected by said [means for] *step of* detecting;

[means for] storing in a memory said first and second tone waveform samples calculated by said [means for] *step of* calculating; and

[means for] generating tone waveforms corresponding to the real-time performance and automatic performance by synchronously reading said first and second tone waveform samples from the memory.

18. A computer system for generating tone waveforms corresponding to first performance information supplied in response to a real-time performance and second performance information supplied in response to an automatic performance, which executes a waveform calculating process for calculating tone waveform samples on the basis of said first and second performance information, respectively, by use of a common arithmetic processing section, said [computer system] *waveform calculating process* comprising *the steps of*:

[means for] calculating a predetermined number of first tone waveform samples for each predetermined block period on the basis of said first performance information supplied in response to a real-time performance, said [means for] *step of* calculating, at [optional] *a* time within first said block period, calculating said predetermined number of first tone waveform samples to be generated within second said block period following said first block period and storing the calculated first tone waveform samples in a memory, said first tone waveform samples stored in the memory being sequentially read out at regular sampling intervals in said second block period;

[means for] detecting a portion of processing capability of said arithmetic processing section which is not currently occupied by a process for calculating said first tone waveform samples, as available processing capability for generation of a tone waveform based on said second performance information;

[means for] calculating second tone waveform samples based on said second performance information in advance of predetermined generation timing thereof, using said available processing capability detected by said [means for] *step of* detecting, said [means for] *step of* calculating second tone waveform samples also storing in a memory the calculated second tone waveform samples; and

[means for] generating tone waveform samples corresponding to the real-time performance and automatic performance by, at regular sampling intervals, reading out from the memory said first and second tone waveform samples corresponding to each same said block period.

*19. A method of generating a tone waveform by a processor which executes a waveform value calculating process, in parallel with another process, for calculating a tone waveform value for each sampling timing on the basis of performance information, said method comprising the steps of:*

*detecting a remaining available portion of processing capability of said processor that is not currently used by the other process;*

*executing the waveform value calculating process based on the performance information using the detected remaining available portion of processing capability so as to generate a given quantity of tone waveform values, wherein said given quantity corresponds to the detected remaining available portion, and storing the generated tone waveform values in a storage section;*

*determining whether the waveform value calculating process in said step of executing is being executed in advance of given read timing;*

*when said step of determining determines that the waveform value calculating process is not being executed in advance of the given read timing, calculating a given quantity of tone waveform values on the basis of the performance information and storing the calculated tone waveform values in the storage section; and*

*generating a tone waveform by reading out, from the storage section, the tone waveform values at the read timing arriving at given time intervals.*

*20. A method of generating a tone waveform by a processor which executes a waveform value calculating process, in parallel with another process, for calculating a tone waveform value for each sampling timing on the basis of received performance information, said method comprising the steps of:*

*calculating a given quantity of tone waveform values in advance of given read timing, by executing the waveform value calculating process based on the performance information;*

*storing the tone waveform values calculated by said calculation step in storage locations of a storage section indicated by writing location data and renewing the writing location data;*

*generating a tone waveform by reading out, from storage locations of the storage section indicated by reading location data, the tone waveform values at the read timing arriving at given time intervals and then renewing the reading location data; and*

*controlling, in response to a difference between said writing location data and reading location data, calculation progression of said step of calculating.*

*21. A method as recited in claim 20 which further comprises a step of detecting a remaining available portion of processing capability of said processor that is not currently used by the other process, and wherein said step of calculating calculates a quantity of tone waveform values corresponding to the remaining available portion detected by said step of detecting, by executing the waveform value calculating process based on the performance information using the detected remaining available portion.*

*22. A method as recited in claim 21 wherein said storing step further comprises the step of providing a ring buffer for said storage section.*

*23. A method as recited in claim 20 wherein said storing step further comprises the step of providing a ring buffer for said storage section.*

*24. A method of generating a tone waveform by a processor which executes a waveform value calculating process, in parallel with another process, for calculating a tone waveform value for each sampling timing on the basis of received performance information, said method comprising the steps of:*

*detecting a remaining available portion of processing capability of said processor that is not currently used by the other process;*

*calculating a given quantity of tone waveform values in advance of given read timing, by executing the waveform value calculating process based on the performance information;*

*storing the tone waveform values calculated by said step of calculating in storage locations of a storage section indicated by writing location data and renewing the writing location data;*

*generating a tone waveform by reading out, from storage locations of the storage section indicated by reading location data, the tone waveform values at read timing arriving at given time intervals and renewing the reading location data;*

*further calculating a given quantity of tone waveform values, on the basis of a relationship between said reading location data and said writing location data, by executing the waveform value calculating process based on the performance information; and*

*further storing the tone waveform values calculated by said step of further calculating in storage locations of*

*the storage section corresponding to the writing location data and renewing the writing location data.*

*25. A method as recited in claim 24 wherein said storing step further comprises the step of providing a ring buffer for said storage section.*

*26. A tone waveform synthesizing apparatus comprising:*

*a storage adapted to temporarily store a plurality of tone waveform samples, said storage permitting the writing and reading, independently of each other, in a parallel fashion, said storage further storing a waveform forming program; and*

*a processor coupled to said storage and adapted to collectively generate a plurality of tone waveform samples in advance of predetermined reproduction timing, by executing the waveform forming program stored in said storage, said processor adapted to control writing of the generated tone waveform samples into said storage and reading out the tone waveform samples from said storage at said reproduction timing, the writing and reading into and from said storage being controlled independently of each other and also in such a manner that an advance of the writing does not outpace an advance of the reading.*

*27. A tone waveform synthesizing apparatus as recited in claim 26 wherein said storage permits the writing and reading, independently of each other, in accordance with separate write instruction and readout instruction signals, respectively, and*

*wherein said processor is adapted to control the write instruction signal so that the tone waveform samples are sequentially written into said storage from a beginning of a predetermined storage region of said storage and, upon arrival at an end of the predetermined storage region, the writing of the tone waveform samples returns to the beginning of the predetermined storage region and also that a writing location, in the storage region, indicated by the write instruction signal does not get ahead of a reading location, in the storage region, indicated by the read instruction signal.*

*28. A method of generating a tone waveform, said method comprising the steps of:*

*collectively generating a plurality of tone waveform samples in advance of predetermined reproduction timing, by a processor executing a waveform forming program;*

*writing, into a storage, the plurality of tone waveform samples produced by said generating step, said storage being capable of writing and reading, independently of each other, in a parallel fashion;*

*reading out the stored tone waveform samples from said storage at said reproduction timing;*

*controlling writing and reading into and from said storage by said steps of writing and reading independently of each other and also in such manner that an advance of the writing does not outpace an advance of the reading; and*

*outputting the tone waveform samples read by said steps of the reading.*

*29. A method as recited in claim 28 wherein said steps of writing and reading into and from said storage further comprise the steps of being performed, independently of each other, in accordance with separate write instruction and readout instruction signals, respectively, and*

*wherein said step of controlling further comprises the step of controlling the write instruction signal so that the tone waveform samples are sequentially written into said storage from a beginning of a predetermined storage region of said storage and, upon arrival at an end of the predetermined storage region, the writing of the tone waveform samples returns to the beginning of the predetermined storage region and also that a writing location, in the storage region, indicated by the write instruction signal does not get ahead of a reading location, in the storage region, indicated by the read instruction signal.*

*30. A method of generating a tone waveform based on performance information, using a processor executing a tone waveform forming program stored in a storage, said method comprising the steps of:*

*receiving automatic performance information;*

*receiving real-time performance information generated in response to a real-time performance operation;*

*generating tone waveform samples using said processor, said step of generating including a step of collectively generating a plurality of tone waveform samples in advance of predetermined reproduction timing on the basis of the received automatic performance information and a step of collectively generating a plurality of tone waveform samples in advance of predetermined reproduction timing on the basis of the received real-time performance information, said step of generating being capable of generating the tone waveform samples based on the automatic performance information and the tone waveform samples based on the real-time performance information in a parallel fashion; and*

*outputting the tone waveform samples generated by said step of generating.*

*31. A method as recited in claim 30 wherein said step of outputting further includes a step of mixing the tone waveform samples based on the automatic performance information and the tone waveform samples based on the real-time performance information to thereby provide mixtures of the samples, each of the mixtures being composed of the tone waveform samples to be reproduced at a same reproduction timing, and a step of writing the mixtures into an output buffer.*

*32. A method as recited in claim 30 wherein said step of generating further comprises the step of performing arithmetic operations for generating the tone waveform samples based on the automatic performance information and the tone waveform samples based on the real-time performance information, independently of each other, in such a manner that an advance of the arithmetic operations for the tone waveform samples based on the automatic performance information and an advance of the arithmetic operations for the tone waveform samples based on the real-time performance information differ from each other.*

*33. A method as recited in claim 32 wherein said step of generating further comprises the step of advancing arithmetic operations for the tone waveform samples based on the automatic performance information within an extent of an available processing capability taking into account a current processing capability of said processor.*

*34. A method of generating a tone waveform using a processor capable of executing a plurality of different programs on a time divisional basis, said method comprising the steps of:*

*supplying said processor with application software including at least an image control program for controlling image display, a music control program for controlling tone generation, and a general control program, said music control program including tone color data;*

*causing said processor to execute, under control by the general control program, the image control program and the music control program in a parallel fashion, to output image data generated as a result of execution of the image control program and tone waveform data generated as a result of execution of the music control program;*

*detecting an available time portion in which said processor is not currently used for any other process than a tone waveform generating process, as an available processing capability for the tone waveform generating process, wherein the tone waveform generating process is controlled by the music control program to generate the tone waveform data;*

*causing said processor to execute the tone waveform generating process based on the music control program, using the available processing capability detected by said step of detecting; and*

*outputting the tone waveform generated by the waveform generating process.*

*35. A method as recited in claim 34 wherein the supplying step further comprises the step of including in the music control program, within the tone color data, waveform data pertaining to at least one given tone color.*

*36. A method as recited in claim 34 wherein the supplying step further comprises the step of including within the music control program a tone waveform generating program for generating tone waveform samples on the basis of performance information.*

*37. A method as recited in claim 34 wherein the supplying step further comprises the step of including, with the application software, software directed to at least one of a karaoke and a game.*

*38. A method as recited in claim 34 wherein the supplying step further comprises the step of supplying the application software to said processor via a communication network.*

*39. A method as recited in claim 34 wherein the supplying step further comprises the step of supplying the application software to said processor by setting, in said processor, a transportable medium storing the application software.*

*40. A machine-readable medium for use in an apparatus having a processor, said medium including instructions executable by said processor for causing said apparatus to perform a method of generating a tone waveform, said method comprising the steps of:*

*collectively generating a plurality of tone waveform samples in advance of predetermined reproduction timing;*

*writing, into a storage, the plurality of tone waveform samples produced by said generating step, said storage being capable of writing and reading, independently of each other, in a parallel fashion;*

*reading out the stored tone waveform samples from said storage at said reproduction timing;*

*controlling writing and reading into and from said storage by said steps of writing and reading independently of each other and also in such a manner that an advance of the writing does not outpace an advance of the reading; and*

*outputting the tone waveform samples read by said step of the reading.*

*41. The medium as recited in claim 40 wherein said steps of writing and reading into and from said storage further comprise the steps of being performed, independently of each other, in accordance with separate write instruction and readout instruction signals, respectively, and*

*wherein said step of controlling further comprises the step of controlling the write instruction signal so that the tone waveform samples are sequentially written into said storage from a beginning of a predetermined storage region of said storage and, upon arrival at an end of the predetermined storage region, the writing of the tone waveform samples returns to the beginning of the predetermined storage region and also that a writing location, in the storage region, indicated by the write instruction signal does not get ahead of a reading location, in the storage region, indicated by the read instruction signal.*

*42. A machine-readable medium for use in an apparatus having a processor, said medium including instructions executable by said processor for causing said apparatus to perform a method of generating a tone waveform by executing a waveform value calculating process, in parallel with another process, for calculating a tone waveform value for each sampling timing on the basis of performance information, said method comprising the steps of:*

*detecting a remaining available portion of processing capability of said processor that is not currently used by the other process;*

*executing the waveform value calculating process based on the performance information using the detected remaining available portion of processing capability so as to generate a given quantity of tone waveform values, wherein said given quantity corresponds to the detected remaining available portion, and storing the generated tone waveform values in a storage section;*

*determining whether the waveform value calculating process in said step of executing is being executed in advance of given read timing;*

*when said step of determining determines that the waveform value calculating process is not being executed in advance of the given read timing, calculating a given quantity of tone waveform values on the basis of the performance information and storing the calculated tone waveform values in the storage section; and*

*generating a tone waveform by reading out, from the storage section, the tone waveform values at the read timing arriving at given time intervals.*

*43. A machine-readable medium for use in an apparatus having a processor, said medium including instructions executable by said processor for causing said apparatus to perform a method of generating a tone waveform by executing a waveform value calculating process, in parallel with another process, for calculating a tone waveform value for each sampling timing on the basis of received performance information, said method comprising the steps of:*

*calculating a given quantity of tone waveform values in advance of given read timing, by executing the waveform value calculating process based on the performance information;*

*storing the tone waveform values calculated by said calculation step in storage locations of a storage section indicated by writing location data and renewing the writing location data;*

*generating a tone waveform by reading out, from storage locations of the storage section indicated by reading location data, the tone waveform values at the read timing arriving at given time intervals and then renewing the reading location data; and*

*controlling, in response to a difference between said writing location data and reading location data, calculation progression of said step of calculating.*

*44. A medium as recited in claim 43 which further comprises a step of detecting a remaining available portion of processing capability of said processor that is not currently used by the other process, and wherein said step of calculating calculates a quantity of tone waveform values corresponding to the remaining available portion detected by said step of detecting, by executing the waveform value calculating process based on the performance information using the detected remaining available portion.*

*45. A medium as recited in claim 44 wherein said storing step further comprises the step of providing a ring buffer for said storage section.*

*46. A medium as recited in claim 43 wherein said storing step further comprises the step of providing a ring buffer for said storage section.*

*47. A machine-readable medium for use in an apparatus having a processor, said medium including instructions executable by said processor for causing said apparatus to perform a method of generating a tone waveform by executing a waveform value calculating process, in parallel with another process, for calculating a tone waveform value for each sampling timing on the basis of received performance information, said method comprising the steps of:*

*detecting a remaining available portion of processing capability of said processor that is not currently used by the other process;*

*calculating a given quality of tone waveform values in advance of given read timing, by executing the waveform value calculating process based on the performance information;*

*storing the tone waveform values calculated by said step of calculating in storage locations of a storage section indicated by writing location data and reviewing the writing location data;*

*generating a tone waveform by reading out, from storage locations of the storage section indicated by reading location data, the tone waveform values at read timing arriving at given time intervals and renewing the reading location data;*

*further calculating a given quantity of tone waveform values, on the basis of a relationship between said reading location data and said writing location data, by executing the waveform value calculating process based on the performance information; and*

*further storing the tone waveform values calculated by said step of further calculating in storage locations of the storage section corresponding to the writing location data and renewing the writing location data.*

*48. A method as recited in claim 47 wherein said storing step further comprises the step of providing a ring buffer for said storage section.*

*49. A tone waveform generating apparatus comprising:*

*a processor;*

*storage coupled to said processor and adapted to store tone waveform values;*

*a program memory storing instructions executable by said processor for causing said apparatus to generate tone waveforms by executing a waveform value calculating process, in parallel with another process, for calculating a tone waveform value for each sampling timing on the basis of performance information, said program memory comprising the steps of:*

*detecting a remaining available portion of processing capability of said processor that is not currently used by the other process;*

*executing the waveform value calculating process based on the performance information using the detected remaining available portion of processing capability so as to generate a given quantity of tone waveform values, wherein said given quantity corresponds to the detected remaining available portion, and storing the generated tone waveform values in said storage;*

*determining whether the waveform value calculating process in said step of executing is being executed in advance of given read timing,*

*when said step of determining determines that the waveform value calculating process is not being executed in advance of the given read timing, calculating a given quantity of tone waveform values on the basis of the performance information and storing the calculated tone waveform values in said storage; and*

*generating a tone waveform by reading out, from said storage, the tone waveform values at the read timing arriving at given time intervals.*

*50. A tone waveform generating apparatus comprising:*

*a processor;*

*storage coupled to said processor and adapted to store a plurality of tone waveform samples; and*

*a program memory storing instructions executable by said processor for causing said apparatus to generate tone waveforms by executing a waveform value calculating process, in parallel with another process, for calculating a tone waveform value for each sampling timing on the basis of received performance information, said program memory comprising the steps of:*

*calculating a given quantity of tone waveform values in advance of given read timing, by executing a waveform value calculating process based on performance information;*

*storing the tone waveform values calculated by said calculation step in storage locations of said storage indicated by writing location data and renewing the writing location data;*

*generating a tone waveform by reading out, from storage locations of said storage indicated by reading locations data, the tone waveform values at the read timing arriving at given time intervals and then renewing the reading location data; and*

*controlling, in response to a difference between said writing location data and reading location data, calculation progression of said step of calculating.*

*51. An apparatus as recited in claim 50 wherein said program memory further comprises the step of detecting a remaining available portion of processing capability of said processor that is not currently used by the other process, and wherein said step of calculating calculates a quantity of tone waveform values corresponding to the remaining available portion detected by said step of detecting, by executing the waveform value calculating process based on the performance information using the detected remaining available portion.*

*52. An apparatus as recited in claim 51 wherein said storage further comprises a ring buffer.*

*53. A method as recited in claim 50 wherein said storage further comprises a ring buffer.*

*54. A tone waveform generating apparatus comprising:*

*a processor;*

*storage coupled to said processor and adapted to store data;*

*a program memory storing instructions executable by said processor for causing said apparatus to generate tone*

*waveforms by executing a waveform value calculating process, in parallel with another process, to calculate a tone waveform value for each sampling timing on the basis of received performance information, said program memory comprising the steps of:*

*detecting a remaining available portion of processing capability of said processor that is not currently used by the other process;*

*calculating a given quantity of tone waveform values in advance of given read timing, by executing the waveform value calculating process based on the performance information;*

*storing the tone waveform values calculated by said step of calculating in storage locations of said storage indicated by writing location data and renewing the writing location data;*

*generating a tone waveform by reading out, from storage locations of said storage indicated by reading location data, the tone waveform values at read timing arriving at given time intervals and renewing the reading location data;*

*further calculating a given quantity of tone waveform values, on the basis of a relationship between said reading location data and said writing location data, by executing the waveform value calculating process based on the performance information; and*

*further storing the tone waveform values calculated by said step of further calculating in storage locations of said storage corresponding to the writing location data and renewing the writing location data.*

*55. An apparatus as recited in claim 54 wherein said storage further comprises a ring buffer.*

*56. A machine-readable medium for use in an apparatus having a processor, said medium including instructions executable by said processor for causing said apparatus to perform a method of generating a tone waveform based on performance information, said method comprising the steps of:*

*receiving automatic performance information;*

*receiving real-time performance information generated in response to a real-time performance operation;*

*generating tone waveform samples using said processor, said step of generating including a step of collectively generating a plurality of toe waveform samples in advance of predetermined reproduction timing on the basis of the received automatic performance information and a step of collectively generating a plurality of tone waveform samples in advance of predetermined reproduction timing on the basis of the received real-time performance information, said step of generating being capable of generating the tone waveform samples based on the automatic performance information and the tone waveform samples based on the real-time performance information in a parallel fashion; and*

*outputting the tone waveform samples generated by said step of generating.*

*57. A medium as recited in claim 56 wherein said step of outputting further includes a step of mixing the tone waveform samples based on the automatic performance information and the tone waveform samples based on the real-time performance information to thereby provide mixtures of the samples, each of the mixtures being composed of the tone waveform samples to be reproduced at a same reproduction timing, and a step of writing the mixtures into an output buffer.*

*58. A medium as recited in claim 56 wherein said step of generating further comprises the step of performing arithmetic operations for generating the tone waveform samples based on the performance information and the tone waveform samples based on the real-time performance information, independently of each other, in such a manner that an advance of the arithmetic operations for the tone waveform samples based on the performance information and an advance of the arithmetic operations for the tone waveform samples based on the real-time performance information differ from each other.*

*59. A medium as recited in claim 58 wherein said step of generating further comprises the step of advancing arithmetic operations for the tone waveform samples based on the performance information within an extent of an available processing capability taking into account a current processing capability of said processor.*

*60. A machine-readable medium for use in an apparatus having a processor, said medium including instructions executable by said processor for causing said apparatus to perform a method of generating a tone waveform by executing a plurality of different programs on the time divisional basis, said method comprising the step of:*

*supplying said processor with application software including at least an image control program for controlling image display, a music control program for controlling tone generation, and a general control program, said music control program including tone color data;*

*causing said processor to execute, under control by the general control program, the image control program and the music control program in a parallel fashion, to output image data generated as a result of execution of the image control program and tone waveform data generated as a result of execution of the music control program;*

*detecting an available time portion in which said processor is not currently used for any other process than a tone waveform generating process, as an available processing capability for the tone waveform generating process; and*

*causing said processor to execute the tone waveform generating process based on the music control program, using the available processing capability detected by said step of detecting.*

*61. A medium as recited in claim 60 wherein the supplying step further comprises the step of including in the music control program, within the tone color data, waveform data pertaining to at least one given tone color.*

*62. A medium as recited in claim 60 wherein the supplying step further comprises the step of including within the music control program a tone waveform generating program for generating tone waveform samples on the basis of performance information.*

*63. A medium as recited in claim 60 wherein the supplying step further comprises the step of including, with the application software, software directed to at least one of a karaoke and a game.*

*64. A medium as recited in claim 60 wherein the supplying step further comprises the step of supplying the application software to said processor via a communication network.*

*65. A medium as recited in claim 60 wherein the supplying step further comprises the step of supplying the application software to said processor by setting, in said processor, a transportable medium storing the application software.*

*66. A tone waveform generating apparatus comprising:*

*storage adapted to receive automatic performance information and to receive real-time performance informa-*

*tion generated in response to a real-time performance operation; and*

*a processor coupled to said storage and adapted to execute a tone waveform forming program stored in said storage, said processor generating tone waveform samples by collectively generating a plurality of tone waveform samples in advance of predetermined reproduction timing on the basis of the automatic performance information and by collectively generating a plurality of tone waveform samples in advance of predetermined reproduction timing on the basis of the real-time performance information, said processor further generating the tone waveform samples based on the automatic performance information and the tone waveform samples based on the real-time performance information in a parallel fashion and outputting the generated tone waveform samples.*

*67. An apparatus as recited in claim 66 wherein said processor further mixes the tone waveform samples based on the automatic performance information and the tone waveform samples based on the real-time performance information to thereby provide mixtures of the samples, each of the mixtures being composed of the tone waveform samples to be reproduced at a same reproduction timing, said processor further writing the mixtures into an output buffer.*

*68. An apparatus as recited in claim 66 wherein said processor further performs arithmetic operations to generate the tone waveform samples based on the automatic performance information and the tone waveform samples based on the real-time performance information, independently of each other, in such a manner that an advance of the arithmetic operations for the tone waveform samples based on the automatic performance information and an advance of the arithmetic operations for the tone waveform samples based on the real-time performance information differ from each other.*

*69. An apparatus as recited in claim 68 wherein said processor further advances arithmetic operations for the tone waveform samples based on the automatic performance information within an extent of an available processing capability taking into account a current processing capability of said processor.*

*70. A tone waveform generating apparatus comprising:*

*storage adapted to storage application software including at least an image control program for controlling image display, a music control program for controlling tone generation, and a general control program, said music control program including tone color data;*

*a processor coupled to said storage and adapted to generate a tone waveform by executing a plurality of different programs on a time divisional basis, said processor adapted to execute, under control by the general control program, the image control program and the music control program in a parallel fashion, to output image data generated as a result of execution of the image control program and tone waveform data generated as a result of execution of the music control program; and*

*detecting an available time portion in which said processor is not currently used for any other process than a tone waveform generating process, as an available processing capability for the tone waveform generating process; and*

*causing said processor to execute the tone waveform generating process based on the music control program, using the available processing capability detected by said step of detecting.*

*71. An apparatus as recited in claim 70 wherein the tone color data included in the music control program contains waveform data pertaining to at least one given tone color.*

*72. An apparatus as recited in claim 70 wherein the music control program includes a tone waveform generating program for generating tone waveform samples on the basis of performance information.*

*73. An apparatus as recited in claim 70 wherein the application software further comprises software directed to at least one of a karaoke and a game.*

*74. An apparatus as recited in claim 70 wherein said application software is supplied via a communication network.*

*75. An apparatus as recited in claim 70 wherein said application software is supplied to said processor by setting, in said processor, a transportable medium storing the application software.*

* * * * *